(12) United States Patent
Schultz et al.

(10) Patent No.: US 9,143,598 B2
(45) Date of Patent: Sep. 22, 2015

(54) PUSHED CONTENT NOTIFICATION AND DISPLAY

(71) Applicants: Charles Peter Schultz, North Miami Beach, FL (US); Rohit Anil Talwalkar, Plantation, FL (US); Jenco Danger, Miami, FL (US); Kannan Narayanan Iyer, North Lauderdale, FL (US)

(72) Inventors: Charles Peter Schultz, North Miami Beach, FL (US); Rohit Anil Talwalkar, Plantation, FL (US); Jenco Danger, Miami, FL (US); Kannan Narayanan Iyer, North Lauderdale, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 250 days.

(21) Appl. No.: 13/632,814

(22) Filed: Oct. 1, 2012

(65) Prior Publication Data

US 2013/0031486 A1 Jan. 31, 2013

Related U.S. Application Data

(63) Continuation of application No. 12/831,459, filed on Jul. 7, 2010, now Pat. No. 8,285,258.

(51) Int. Cl.
*G06F 3/00* (2006.01)
*H04M 1/725* (2006.01)
*G06F 9/44* (2006.01)

(52) U.S. Cl.
CPC ...... *H04M 1/72519* (2013.01); *H04M 1/72544* (2013.01); *H04M 1/72583* (2013.01); *G06F 9/4443* (2013.01); *H04M 1/72552* (2013.01); *H04M 2250/60* (2013.01)

(58) Field of Classification Search
CPC .................................................... G06F 9/4443
USPC .......................................................... 715/748
See application file for complete search history.

(56) References Cited

U.S. PATENT DOCUMENTS

| | | | |
|---|---|---|---|
| 5,819,914 A | 10/1998 | Yoneyama | |
| 6,941,310 B2 | 9/2005 | Ahad et al. | |
| 7,567,542 B2* | 7/2009 | Rybak et al. | 370/338 |
| 7,623,877 B2 | 11/2009 | Neil et al. | |
| 7,631,259 B2* | 12/2009 | Kirn et al. | 715/716 |
| 7,764,970 B2 | 7/2010 | Neil et al. | |
| 7,809,383 B2* | 10/2010 | Rybak et al. | 455/466 |

(Continued)

FOREIGN PATENT DOCUMENTS

| | | |
|---|---|---|
| WO | 9856151 A1 | 12/1998 |
| WO | 2006075200 A1 | 7/2006 |

OTHER PUBLICATIONS

Extended European Search report mailed Dec. 3, 2010, in corresponding European patent application No. 10168742.4.

(Continued)

*Primary Examiner* — William Titcomb
(74) *Attorney, Agent, or Firm* — Fish & Richardson P.C.

(57) ABSTRACT

Presenting content within an application on a device is disclosed. Receiving notification of new content within an application at a device is disclosed. Presenting the received notification at the device is disclosed. Receiving a selection of the notification, and displaying the new content in the screen directly following receiving the selection of the notification are disclosed. Notification can be received outside the application, e.g., by posting notification on a social network, posting notification to a web site, and posting a message to a user's avatar in a virtual world. A selection can be received while the device is offline, in which case the new content displayed is that content stored on the device.

18 Claims, 8 Drawing Sheets

(56) References Cited

U.S. PATENT DOCUMENTS

| | | | |
|---|---|---|---|
| 8,209,634 | B2 | 6/2012 | Klassen et al. |
| 2002/0046299 | A1 | 4/2002 | Lefeber et al. |
| 2002/0082054 | A1 | 6/2002 | Keinonen et al. |
| 2002/0083145 | A1 | 6/2002 | Perinpanathan |
| 2005/0120306 | A1 | 6/2005 | Klassen et al. |
| 2006/0123087 | A1* | 6/2006 | Gibson ................. 709/206 |
| 2007/0121819 | A1* | 5/2007 | Kirn et al. ............ 379/88.13 |
| 2007/0266093 | A1* | 11/2007 | Forstall et al. ............ 709/204 |
| 2008/0140709 | A1* | 6/2008 | Sundstrom ............ 707/104.1 |
| 2008/0280636 | A1 | 11/2008 | Kim |
| 2009/0007198 | A1* | 1/2009 | Lavender et al. ........... 725/91 |
| 2009/0042607 | A1 | 2/2009 | Adachi et al. |
| 2009/0305732 | A1* | 12/2009 | Marcellino et al. ......... 455/466 |
| 2010/0250693 | A1* | 9/2010 | Zheng et al. ............. 709/206 |
| 2010/0280641 | A1* | 11/2010 | Harkness et al. ............ 700/94 |
| 2011/0251568 | A1 | 10/2011 | Beeley et al. |
| 2011/0314516 | A1* | 12/2011 | Li et al. ................... 726/3 |
| 2012/0009903 | A1* | 1/2012 | Schultz et al. ........... 455/412.2 |

OTHER PUBLICATIONS

Christian Zibreg, What to do about push notifications and contacts sync in Facebook 3.1 for iphone, Jan. 13, 2010, Cell Phones & Mobile Device Technology News & Updates Geek_com.mht.pp. 1-12.

Thomas Trumble, Viigo News Less Filling, Works Great, Sep. 24, 2009, trumblog.mht., pp. 1-4.

Adam Nash, The linkedin Blog-Linkedin for iphone 3_0 Let's get this party started.mht., Dec. 28, 2009, pp. 1-20.

Junbiao Zhang and Remo Strotkamp, Wireless Access to a content Routing system, 2001, pp. 1-2, wwwposters.

Examination report mailed Jul. 24, 2012, in corresponding European patent application No. 10168742.4.

Office Action mailed Apr. 29, 2013, in corresponding Canadian patent application No. 2,745,164.

Notice of Allowance and Fee9s) Due mailed Apr. 17, 2014; in corresponding Canadian patent application No. 2,745,164.

Examination Report mailed Jun. 25, 2014; in corresponding European patent application No. 10168742.4.

* cited by examiner

PUSHED CONTENT NOTIFICATION AND DISPLAY

CROSS-REFERENCE TO RELATED APPLICATION

This application is a continuation of U.S. application Ser. No. 12/831,459 which was filed on Jul. 7, 2010 and which is entirely incorporated by reference herein.

FIELD OF THE TECHNOLOGY

The technology disclosed herein relates to presentation of new content via a communication device. Exemplary implementations of the technology are presented in the context of a mobile communications device and its enterprise network.

DETAILED DESCRIPTION

Reference will now be made in detail to implementations of the technology. Each example is provided by way of explanation of the technology only, not as a limitation of the technology. It will be apparent to those skilled in the art that various modifications and variations can be made in the present technology. For instance, features described as part of one implementation of the technology can be used on another implementation to yield a still further implementation. Thus, it is intended that the present technology cover such modifications and variations that come within the scope of the technology.

Figure 1:
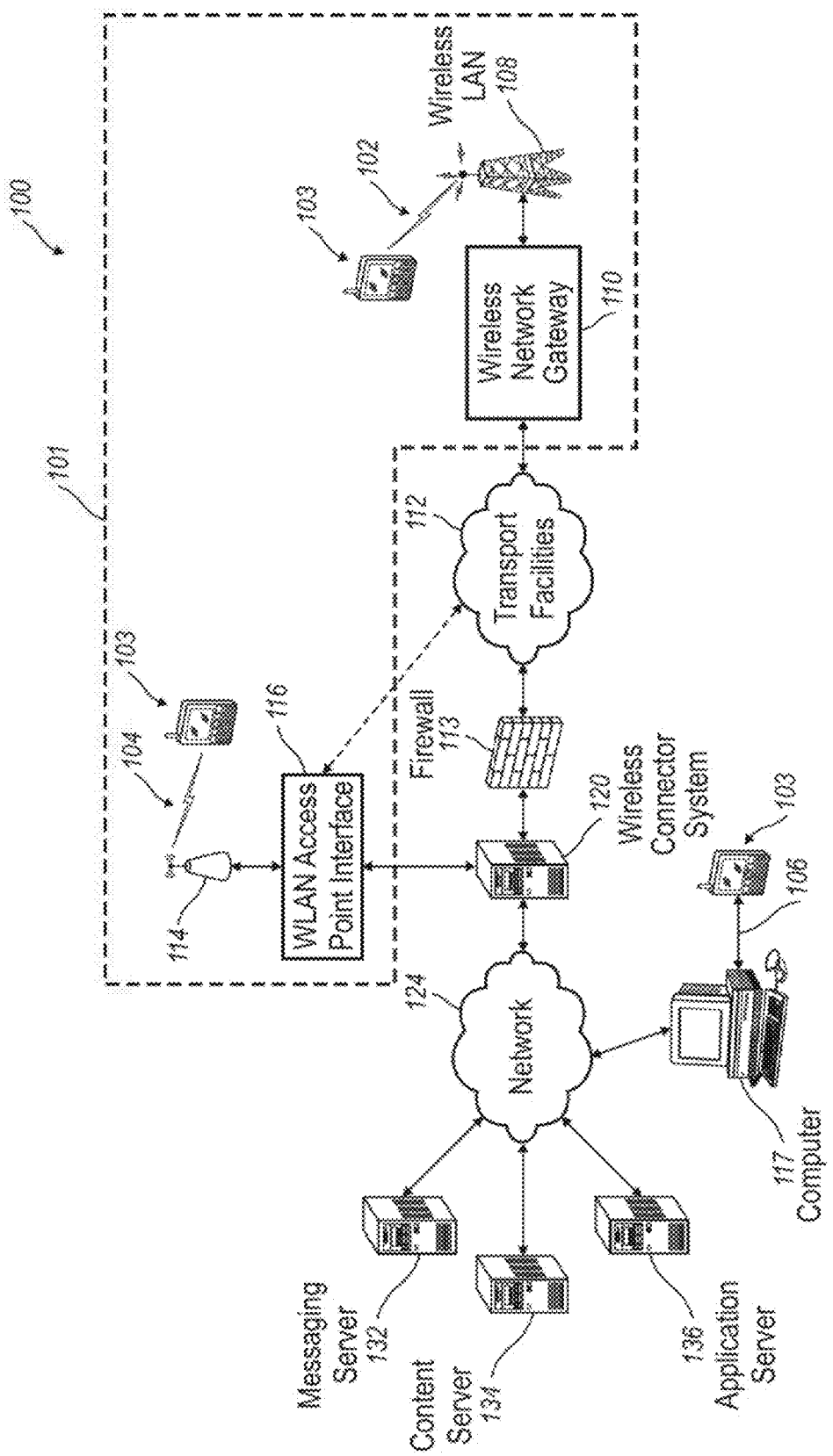
FIG. 1 illustrates a communication system including a mobile communication device to which example implementations of the technology can be applied.

In order to facilitate an understanding of environments in which example implementations described herein can operate, reference is made to FIG. 1, which shows, in block diagram form, a communication system 100 in which implementations of the technology can be applied. The communication system 100 may comprise a number of mobile communication devices 103 that may be connected to the remainder of system 100 in any of several different ways. Accordingly, several instances of mobile communication devices 103 are depicted in FIG. 1 employing different example ways of connecting to system 100.

These figures are exemplary only, and those persons skilled in the art will appreciate that additional elements and modifications may be necessary to make the communication device, e.g., 103 operable in particular network environments. While in the illustrated implementations, the communication devices, e.g., 103 may comprise smart phones, in other implementations, the communication devices may comprise personal digital assistants (PDA), tablet computers, laptop computers, desktop computers, servers, or other communication devices capable of sending and receiving electronic messages.

Mobile communication devices 103 are connected to a wireless network 101 that may comprise one or more of a Wireless Wide Area Network (WWAN) 102 and a Wireless Local Area Network (WLAN) 104 or other suitable network arrangements. In some implementations, the mobile communication devices 103 are configured to communicate over both the WWAN 102 and WLAN 104, and to roam between these networks. In some implementations, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 where each of the base stations 108 provides wireless Radio Frequency (RF) coverage to a corresponding area or cell. The WWAN 102 is typically operated by a mobile network service provider that provides subscription packages to users of the mobile communication devices 103. In some implementations, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 that connects the mobile communication devices 103 to transport facilities 112, and through the transport facilities 112 to a wireless connector system 120. Transport facilities 112 may include one or more private networks or lines, the Internet, a virtual private network, or any other suitable network. The wireless connector system 120 may be operated, for example, by an organization or enterprise such as a corporation, university, or governmental department, which allows access to a network 124 such as an internal or enterprise network (e.g., an intranet) and its resources, or the wireless connector system 120 may be operated by a mobile network provider. In some implementations, the network 124 may be realized using the Internet rather than, or in addition to, an internal or enterprise network.

The wireless network gateway 110 provides an interface between the wireless connector system 120 and the WWAN 102, which facilitates communication between the mobile communication devices 103 and other devices (not shown) connected, directly or indirectly, to the WWAN 102. Accordingly, communications sent via the mobile communication devices 103 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 103.

The WLAN 104 comprises a wireless network that, in some implementations, conforms to IEEE 802.11x standards (sometimes referred to as Wi-Fi™) such as, for example, the IEEE 802.11a, 802.11b and/or 802.11g standard. Other communication protocols may be used for the WLAN 104 in other implementations such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 that may connect to the wireless connector system 120 directly, (for example, if the access point 114 is part of an enterprise WLAN 104 in which the wireless connector system 120 resides), or indirectly, as indicated by the dashed line in FIG. 1, via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email, Hypertext Transfer Protocol (HTTP), and HTTP Secure (HTTPS) communications to and from a set of managed mobile communication devices 103. The wireless connector system 120 also provides administrative control and management capabilities over users and mobile communication devices 103 that might connect to the wireless connector system 120.

The wireless connector system 120 allows the mobile communication devices 103 to access the network 124 and connected resources and services such as a messaging server 132 (for example, a Microsoft Exchange Server®, IBM Lotus Domino®, or Novell GroupWise™ email server), a content server 134 for providing content such as Internet content or content from an organization's internal servers, application servers 136 for implementing server-based applications such as instant messaging (IM) applications to mobile communication devices 103, and intranet file services.

The wireless connector system 120 typically provides a secure exchange of data (e.g., email messages, personal information manager (PIM) data, and IM data) with the mobile communication devices 103. In some implementations, communications between the wireless connector system 120 and the mobile communication devices 103 are encrypted. In some implementations, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some implementations, the private encryption key is stored only in the user's mailbox on the messaging server 132 and on the mobile communication device 103, and can typically be regenerated by the user on mobile communication devices 103. Data sent to the mobile communication devices 103 is encrypted by the wireless connector system 120 using the private encryption key retrieved from the user's mailbox. The encrypted data, when received on the mobile communication devices 103, is decrypted using the private encryption key stored in memory. Similarly, data sent to the wireless connector system 120 from the mobile communication devices 103 is encrypted using the private encryption key stored in the memory of the mobile communication device 103. The encrypted data, when received on the wireless connector system 120, is decrypted using the private encryption key retrieved from the user's mailbox.

The wireless network gateway 110 is adapted to send data packets received from the mobile communication device 103 over the WWAN 102 to the wireless connector system 120. The wireless connector system 120 then sends the data packets to the appropriate connection point such as the messaging server 132 or content servers 134 or application server 136. Conversely, the wireless connector system 120 sends data packets received, for example, from the messaging server 132 or content servers 134 or application servers 136 to the wireless network gateway 110 that then transmit the data packets to the destination mobile communication device 103. The AP interfaces 116 of the WLAN 104 provide similar sending functions between the mobile communication device 103, the wireless connector system 120 and network connection point such as the messaging server 132, content server 134 and application server 136.

The network 124 may comprise a private local area network, metropolitan area network, wide area network, the public Internet or combinations thereof and may include virtual networks constructed using any of these, alone, or in combination. A mobile communication device 103 may alternatively connect to the wireless connector system 120 using a computer 117, such as desktop or notebook computer, via the network 124. A link 106 may be provided for exchanging information between the mobile communication device 103 and a computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 103 and computer 117. The short-range wireless communication interface may be a personal area network (PAN) interface. A Personal Area Network is a wireless point-to-point connection meaning no physical cables are used to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the BLUETOOTH special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communication devices 103. Suitable variations of the communication system will be understood to a person of skill in the art and are intended to fall within the scope of the present disclosure.

Figure 3:
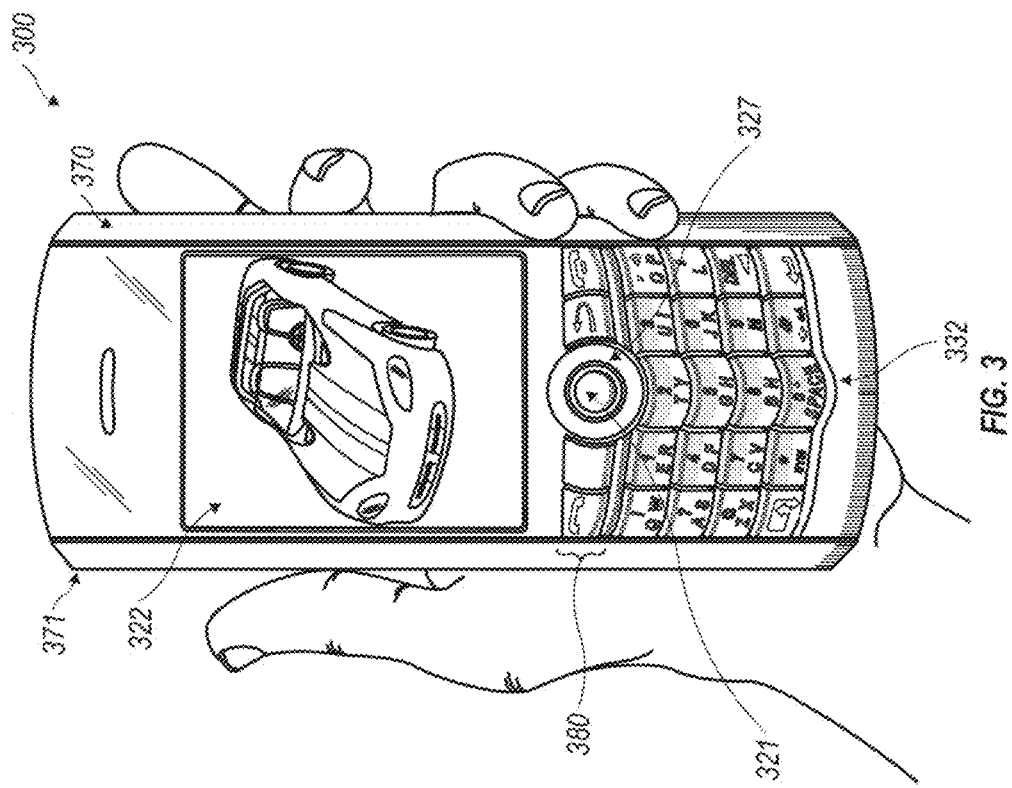
FIG. 3 illustrates an exemplary mobile communication device used in implementations of the technology.

As will be appreciated from FIG. 3, an exemplary mobile communication device 300 (as an example of 103) comprises a display 322 located above a keyboard 332 constituting a user input means that is suitable for accommodating textual input to the device 300. In some implementations, the keyboard 332 can be part of a touch screen display. The front face 370 of the device 300 has a navigation row 380. As shown, the device 300 is of uni-body construction, also known as a "candy-bar" design.

The device 300 may include an auxiliary input that acts as a cursor navigation tool 327 and that may be also exteriorly located upon the front face 370 of the device 300. The front face location of a cursor navigation tool 327 allows the tool to be thumb-actuable, e.g., like the keys of the keyboard 332. Some implementations of the technology provide the navigation tool 327 in the form of a trackball 321 that may be utilized to instruct two-dimensional screen cursor movement in substantially any direction, as well as act as an actuator when the trackball 321 is depressed like a button. Other implementations can provide the navigation tool in the form of a trackpad, a touchpad, a pointing stick, joystick, graphics tablet, or combinations thereof. The placement of the navigation tool 327 can be above the keyboard 332 and below the display screen 322; here, it may avoid interference during keyboarding and does not block the operator's view of the display screen 322 during use.

The device 300 may be configured to send and receive messages. The device 300 includes a body 371 that can, in some implementations, be configured to be held in one hand by an operator of the device 300 during text entry. A display 322 is included that is located on a front face 370 of the body 371 and upon which information is displayed to the operator, e.g., during text entry. The device 300 may also be configured to send and receive voice communications such as mobile telephone calls. The device 300 also can include a camera (not shown) to allow the device 300 to take electronic photographs that can be referred to as photos or pictures. Further, the device 300 can be configured to operate a web browser.

Figure 4:
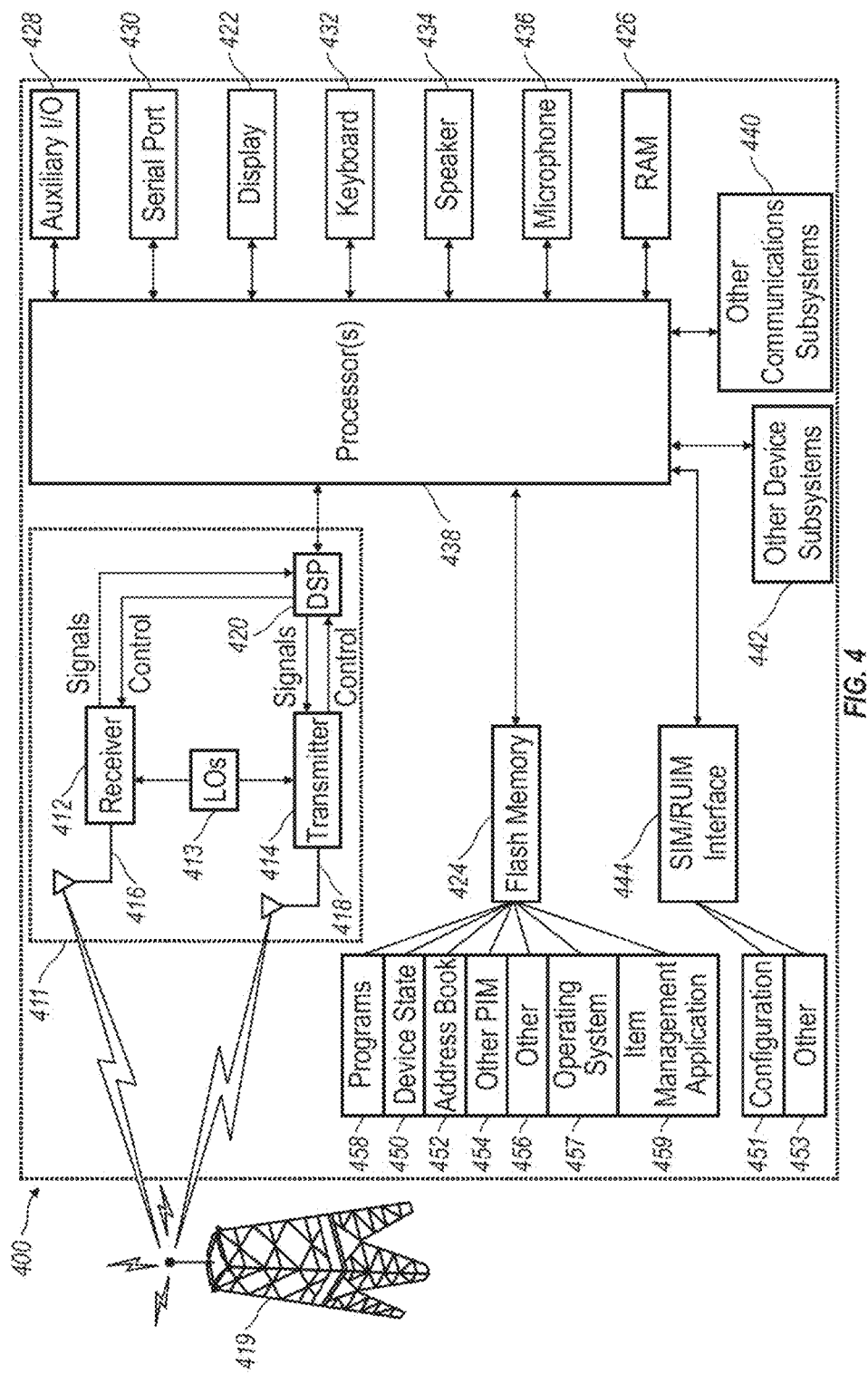
FIG. 4 illustrates a device, such as in FIG. 3, in detail.

Referring to FIG. 4, a block diagram of a communication device, such as 300 and 103, in accordance with an exemplary implementation is illustrated. As shown, the device 400 includes a microprocessor 438 that controls the operation of the communication device 400. A communication subsystem 411 performs communication transmission and reception with the wireless network 419. The microprocessor 438 further can be communicatively coupled with an auxiliary input/output (I/O) subsystem 428 that can be communicatively coupled to the communication device 400. In at least one implementation, the microprocessor 438 can be communicatively coupled to a serial port (for example, a Universal Serial Bus port) 430 that can allow for communication with other devices or systems via the serial port 430. A display 422 (e.g., 322) can be communicatively coupled to microprocessor 438 to allow for display of information to an operator of the communication device 400. When the communication device 400 is equipped with a keyboard 432 (e.g., 332), the keyboard can also be communicatively coupled with the microprocessor 438. The communication device 400 can include a speaker 434, a microphone 436, random access memory (RAM) 426, and flash memory 424, all of which may be communicatively coupled to the microprocessor 438. Other similar components may be provided on the communication device 400 as well and optionally communicatively coupled to the microprocessor 438. Other communication subsystems 440 and other communication device subsystems 442 are generally indicated as being functionally connected with the microprocessor 438 as well. An example of a communication subsystem 440 is a short range communication system such as BLUETOOTH® communication module or a WI-FI® communication module (a communication module in compliance with IEEE 802.11b) and associated circuits and components. Additionally, the microprocessor 438 is able to perform operating system functions and enables execution of programs on the communication device 400. In some implementations not all of the above components are included in the communication device 400. For example, in at least one implementation, the keyboard 432 is not provided as a separate component and is instead integrated with a touch screen as described below.

The auxiliary I/O subsystem 428 can take the form of a variety of different navigation tools (multi-directional or single-directional) such as a trackball navigation tool 321, as illustrated in the exemplary implementation shown in FIG. 3, or a thumbwheel, a navigation pad, a joystick, touch-sensitive interface, or other I/O interface. These navigation tools may be located on the front surface of the communication device 400 or may be located on any exterior surface of the communication device 400. Other auxiliary I/O subsystems may include external display devices and externally connected keyboards (not shown). While the above examples have been provided in relation to the auxiliary I/O subsystem 428, other subsystems capable of providing input or receiving output from the communication device 400 are considered within the scope of this disclosure. Additionally, other keys may be placed along the side of the communication device 300 to function as escape keys, volume control keys, scrolling keys, power switches, or user programmable keys, and may likewise be programmed accordingly.

The keyboard 432 can include a plurality of keys that can be of a physical nature such as actuable buttons, or they can be of a software nature, typically constituted by representations of physical keys on a display 422 (referred to herein as "virtual keys"). It is also contemplated that the user input can be provided as a combination of the two types of keys. Each key of the plurality of keys is associated with at least one action which can be the input of a character, a command or a function. In this context, "characters" are contemplated to exemplarily include alphabetic letters, language symbols, numbers, punctuation, insignias, icons, pictures, and even a blank space.

In the case of virtual keys, the indicia for the respective keys are shown on the display 422, which in one implementation is enabled by touching the display 422, for example, with a stylus, finger, finger tip, finger nail, or other pointer, to generate the character or activate the indicated command or function. Some examples of displays 422 capable of detecting a touch include resistive, capacitive, projected capacitive, infrared and surface acoustic wave (SAW) touch screens.

Physical and virtual keys can be combined in many different ways as appreciated by those skilled in the art. In one implementation, physical and virtual keys are combined such that the plurality of enabled keys for a particular program or feature of the communication device 400 is shown on the display 422 in the same configuration as the physical keys. Using this configuration, the operator can select the appropriate physical key corresponding to what is shown on the display 422. Thus, the desired character, command or function is obtained by depressing the physical key corresponding to the character, command or function displayed at a corresponding position on the display 422, rather than touching the display 422.

Furthermore, the communication device 400 is equipped with components to enable operation of various programs, as shown in FIG. 4. In an exemplary implementation, the flash memory 424 is enabled to provide a storage location for the operating system 457, device programs 458, and data. The operating system 457 is generally configured to manage other programs 458 that are also stored in memory 424 and executable on the processor 438. The operating system 457 honors requests for services made by programs 458 through predefined program 458 interfaces. More specifically, the operating system 457 typically determines the order in which multiple programs 458 are executed on the processor 438 and the execution time allotted for each program 458, manages the sharing of memory 424 among multiple programs 458, handles input and output to and from other device subsystems 442, and so on. In addition, operators can typically interact directly with the operating system 457 through a user interface usually including the keyboard 432 and display 422. While in an exemplary implementation the operating system 457 is stored in flash memory 424, the operating system 457 in other implementations is stored in read-only memory (ROM) or similar storage element (not shown). As those skilled in the art will appreciate, the operating system 457, device program 458, or parts thereof, may be loaded in RAM 426 or other volatile memory.

In some implementations, the flash memory 424 may contain programs 458 for execution on the device 400, including—but not limited to—an address book 452, a personal information manager (PIM) 454, and a device state 450. Furthermore, programs 458, such as social software, and other information 456 including data can be segregated upon storage in the flash memory 424 of the device 400.

When the communication device 400 is enabled for two-way communication within the wireless communication network 419, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 400 may use a unique identifier to enable the communication device 400 to transmit and receive signals from the communication network 419. Other systems may not use such identifying information. GPRS, UMTS, and EDGE use a Subscriber Identity Module (SIM) in order to allow communication with the communication network 419. Likewise, most CDMA systems use a Removable User Identity Module (RUIM) in order to communicate with the CDMA network. The RUIM and SIM card can be used in multiple different communication devices 400. The communication device 400 can be configured to operate some features without a SIM/RUIM card, but it will not necessarily be able to communicate with the network 419. A SIM/RUIM interface 444 located within the communication device 400 allows for removal or insertion of a SIM/RUIM card (not shown). The SIM/RUIM card features memory and holds key configurations 451, and other information 453 such as identification and subscriber related information. With a properly enabled communication device 400, two-way communication between the communication device 400 and communication network 419 is possible.

If the communication device 400 is enabled as described above or the communication network 419 does not use such enablement, the two-way communication enabled communication device 400 is able to both transmit and receive information from the communication network 419. The transfer of communication can be from the communication device 400 or to the communication device 400. In order to communicate with the communication network 419, the device 400 can be equipped with an integral or internal antenna 418 for transmitting signals to the communication network 419. Likewise the device 400 can be equipped with another antenna 416 for receiving communication from the communication network 419. These antennae (416, 418) in another exemplary implementation are combined into a single antenna (not shown). As one skilled in the art would appreciate, the antenna or antennae (416, 418) in another implementation can be externally mounted on the communication device 400.

When equipped for two-way communication, the communication device 400 features a communication subsystem 411. As is understood in the art, this communication subsystem 411 is modified so that it can support the operational needs of the communication device 400. The subsystem 411 includes a transmitter 414 and receiver 412 including the associated antenna or antennae (416, 418) as described above, local oscillators (LOs) 413, and a processing module that in the presently described exemplary implementation is a digital signal processor (DSP) 420.

It is contemplated that communication by the communication device 400 with the wireless network 419 can be any type of communication that both the wireless network 419 and communication device 400 are enabled to transmit, receive and process. In general, these can be classified as voice or data, or both voice and data. Voice communication generally refers to communication in which signals for audible sounds are transmitted by the communication device 400 through the communication network 419. Data generally refers to all other types of communication that the communication device 400 is capable of performing within the constraints of the wireless network 419.

Example device programs that can depend on such data include email, contacts and calendars. For each such program, synchronization with home-based versions of the program can be desirable for either or both of their long term and short term utility. As an example, emails are often time-sensitive, so substantially real time (or near-real time) synchronization may be desired. Contacts, on the other hand, can be usually updated less frequently without inconvenience. Therefore, the utility of the communication device 400 is enhanced when connectable within a communication system, and when connectable on a wireless basis in a network 419 in which voice, text messaging, and other data transfer are accommodated. Device 400 can include programs such as a web browser, a file browser, and client programs for interacting with server programs. Devices, e.g., 103, 300, 400, for use in the technology can be characterized by an identification number assigned to the device. Such identification numbers cannot be changed and are locked to each device.

Implementations of the technology can be realized as programming across the architectural elements identified in FIG. 1, FIG. 3, and FIG. 4. In some implementations, the programming is entirely on the mobile communications device 103. In some implementations, programming for the technology is on the mobile communications device 103, while data used by the mobile communications device 103 is on the wireless connector system 120 or a network server such as content server 134, messaging server 132, or application server 136. In some implementations, programming for the technology can be realized on a remote server. Allocation of functionality among architectural elements can be a function of several factors including latency, processing resource availability and efficient usage, storage availability and efficient usage, and revenue opportunities.

Social software encompasses a range of software systems that allow users to interact and share data. This computer-mediated communication has become very popular with social sites like MySpace®, Facebook™ and Bebo™, media sites like Flickr® and YouTube™, as well as commercial sites like Amazon.com® and eBay®. Many of these applications share characteristics like open application programming interfaces (APIs), service-oriented design, and the ability to upload data and media. The terms "Web 2.0" and (for large-business applications) Enterprise 2.0, are also used to describe this style of software. The more specific terms "collaborative software" and "groupware" are usually applied to software that enables collaborative work. Distinctions among usage of the terms "social," "trusted," and "collaborative" are in the applications or uses, not the tools themselves, although some tools are used only rarely for collaborative work.

IBM Lotus® Connections is an example of a social software application. Lotus Connections has ten parts: Homepage—a portal site that can federate information from many sources; Profiles—a social network service—primarily used to find people in the organization; Communities—a collaborative space for people with common interests to work together; Blogs—a blogging service; Bookmarks—a social bookmarking service; Activities—a task management tool for groups of people to work together on a specific project or task; Files—a content library for storing, sharing and revision management of computer files; Wikis—a Wiki system for publishing and editing content; Tags—for describing and organizing information, content, and people; and Microblogs—for keeping the extended network apprised of status, etc.

Modules are built on a set of services according to the service-oriented architecture concept. These modules take the form of applications which are hosted on an application server. This design allows the modules to be hosted independently of each other, combined with each other, or interact with each other, in support of very large scale deployments.

The Homepage serves as a portal for users' social collaboration. Out of the box, Lotus Connections provides seven components that can be individually installed, enabled and/or customized by the user. Information Technology (IT) Administrators can add new components, applications or widgets for use by users. The Homepage module also includes a recent updates display which shows changes such as new content posts and status updates which are relevant to the user. A system to update the user's status via microblogging is also provided.

The Profiles module provides an online directory of people within an organization. People can be located in different ways, such as by: keywords, names, responsibilities, interests, projects they are part of, their expertise, their business relationships, tags applied to their profile, and their geographical location. A profile typically contains a person's name, job role, base location, reporting chain and details about the Lotus Connection bookmarks, activities, communities and blogs in which the person participates. Profiles can also be customized and new fields added.

The Activities module is a task management system that enables groups of people to collaborate on a task. Activities may be structured in a nested tree hierarchy where entries, to-do items and sections branch off from the root activity. Any non-section entity in an activity can contain rich-text and custom fields for files, links, text, people and dates. To-Do items can also have a due date and the name of each person assigned to the To-Do task.

The Wikis module can facilitate the collaborative creation of web content.

The Files module is a file-sharing service that can be used to upload and share files, tag them, and recommend/comment on them.

The Communities module enables ad-hoc and planned collaboration around a project or area of interest. A Connections Community can have its own blog, forums, bookmarks, activities, feeds, member list, Wiki and Files.

The Blogs service allows a user to present ideas, get feedback from others, and learn from the expertise and experience of others who blog. A blog can be created for the use of the members of a community. Videos, links and images can be embedded in a blog posting.

The Bookmarks social bookmarking service permits users to save, organize, and share bookmarks; and also discover bookmarks that have been qualified by others. Browser bookmarks or subsets of browser bookmarks can be imported into the Bookmarks service. This can prove useful when initially populating a bookmarks list in the Bookmarks service, or updating it with a new topic of interest. Bookmarks can also be exported from the Bookmarks service and imported into a browser or shared with someone who does not use the Bookmarks service.

Figure 5:
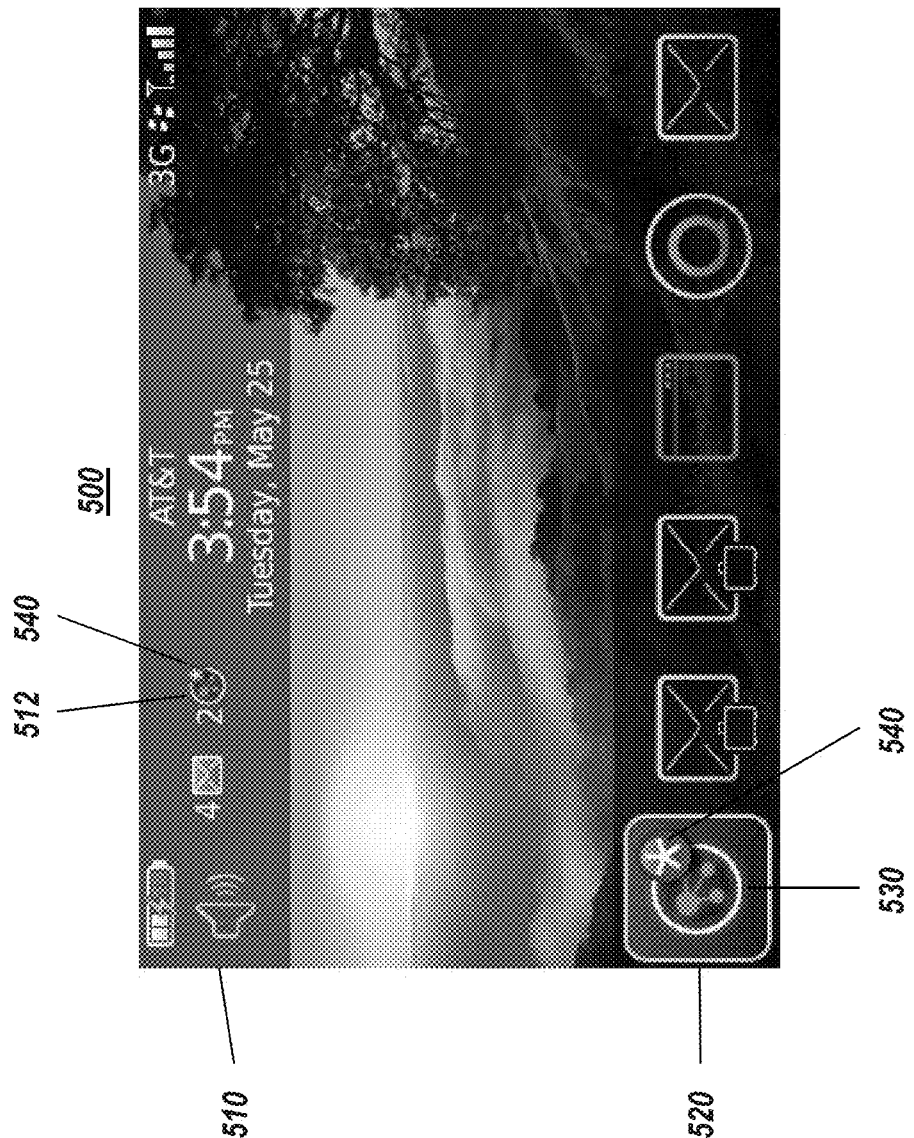
FIG. 5 illustrates a device home screen of the present technology.

New content (e.g., a status update, an article from an aggregator service, an instant message, an e-mail, a new/updated wiki or blog entry, a change to a collaboratively created/edited document, a new forum post) can be pushed to a mobile device to be accessed by a user of a social software application. Typical social software applications provide some notification of new content pushed to a device. Referring to FIG. 5, a home screen 500 of a mobile device (e.g., 103, 300, 400) is shown. The home screen 500 includes a header 510 and a footer 520. The footer 520 displays an icon for each of several applications, including an icon 530 for Lotus Connections. The arrival of new content can be indicated by an asterisk 540 (e.g., white) on a solid color (e.g., red) circular background, located, for example, in the upper right quadrant, e.g., superscript position of an icon, e.g., icon 530. Given that footer 520 is not always shown on a typical mobile device home screen 500, the arrival of new content can be indicated by an asterisk 540 in mini-icon 512 of the device home screen header 510. In addition, a notification of the arrival of new content can be given using one or more other graphical indicators, sound, vibration, haptic feedback, transmission or publication of a notification to one or more other applications (e.g. a social networking and microblogging application such as Twitter or a user's email account), a window that clears upon the device receiving acknowledgement and/or a window that clears upon the device receiving other input (e.g., a splat). When the application is opened, e.g., by the device receiving selection of an icon, e.g., 530, the device can display further indication of which feature of the application contains the newly pushed content. Beyond that, however, the user is left to navigate within the application to find the new content.

Figure 6:
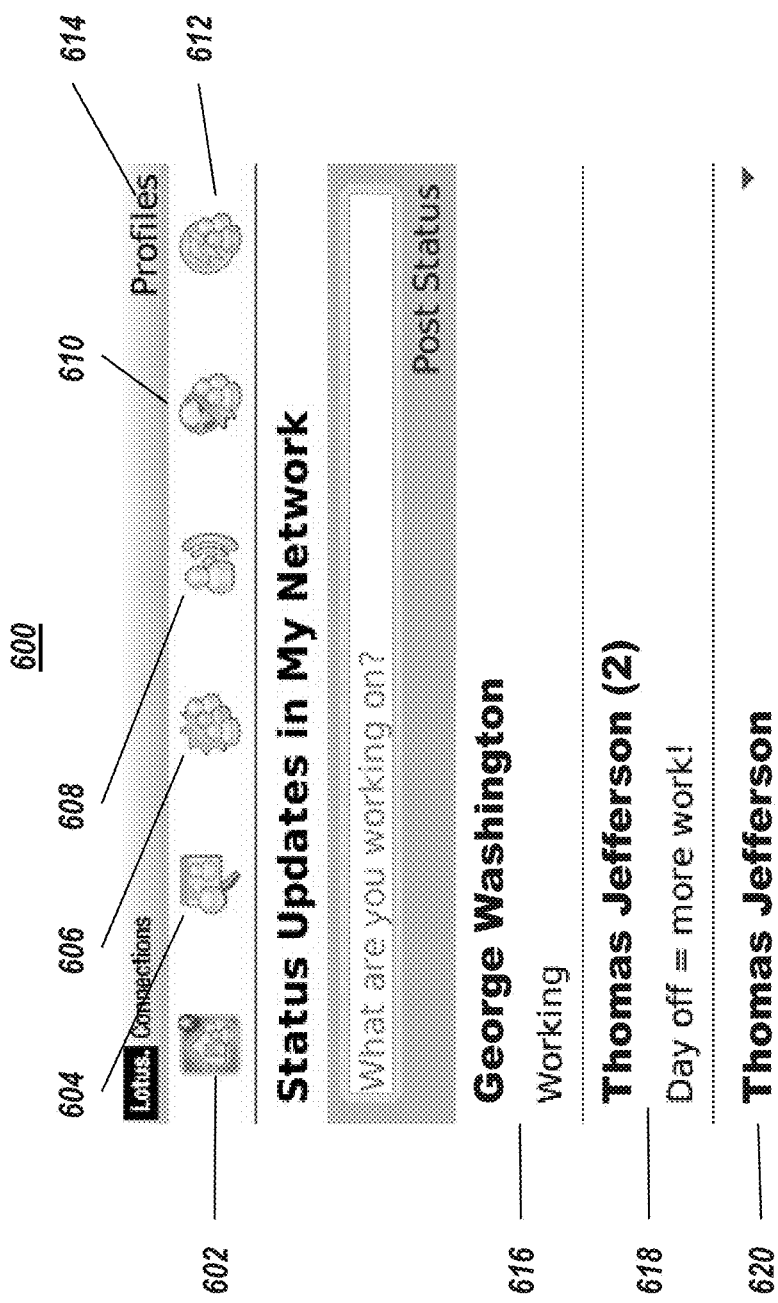
FIG. 6 illustrates a status updates page of the present technology.

FIG. 6 illustrates a Status Updates in My Network screen 600 of the Connections application using the present technology. The screen 600 includes icons for application parts, i.e., Homepage 602, Profiles 604, Communities 606, Blogs 608, Bookmarks 610, and Activities 612. The screen 600 displays updates for the Profiles part of Lotus Connections, as indicated by title 614. Status updates 616, 618, and 620 are displayed. Homepage icon 602 displays a new update notification as a white asterisk in a red circle in the upper right corner of the Homepage icon 602.

Figure 7:
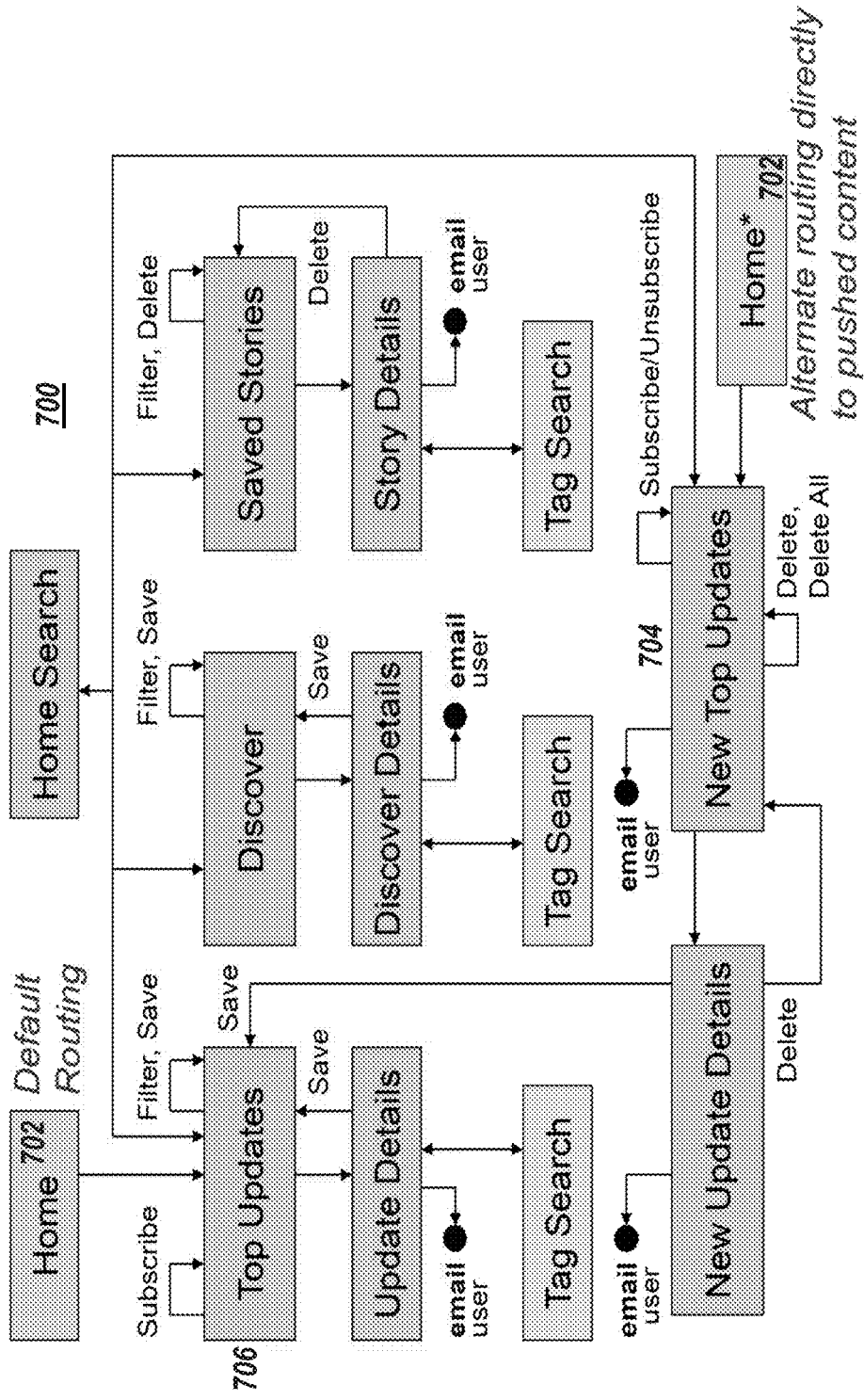
FIG. 7 illustrates a page flow of the present technology.

Applications and functions within applications typically have a "landing page" that can provide a consistent or predictable screen that can be displayed in order to help orient a user for further navigation. Content below the landing page can provide different and interconnected paths to additional screens. The landing page can differ for each major function or component (usually indicated by a distinct navigation icon). The landing page can be the most recent page displayed by the application. Referring to FIG. 7, a navigation diagram 700 of the present technology is shown. Upon a complete restart of the application, the application Homepage 702 (as distinguished from the device home screen, e.g., 500) can be the landing page.

Figure 2:
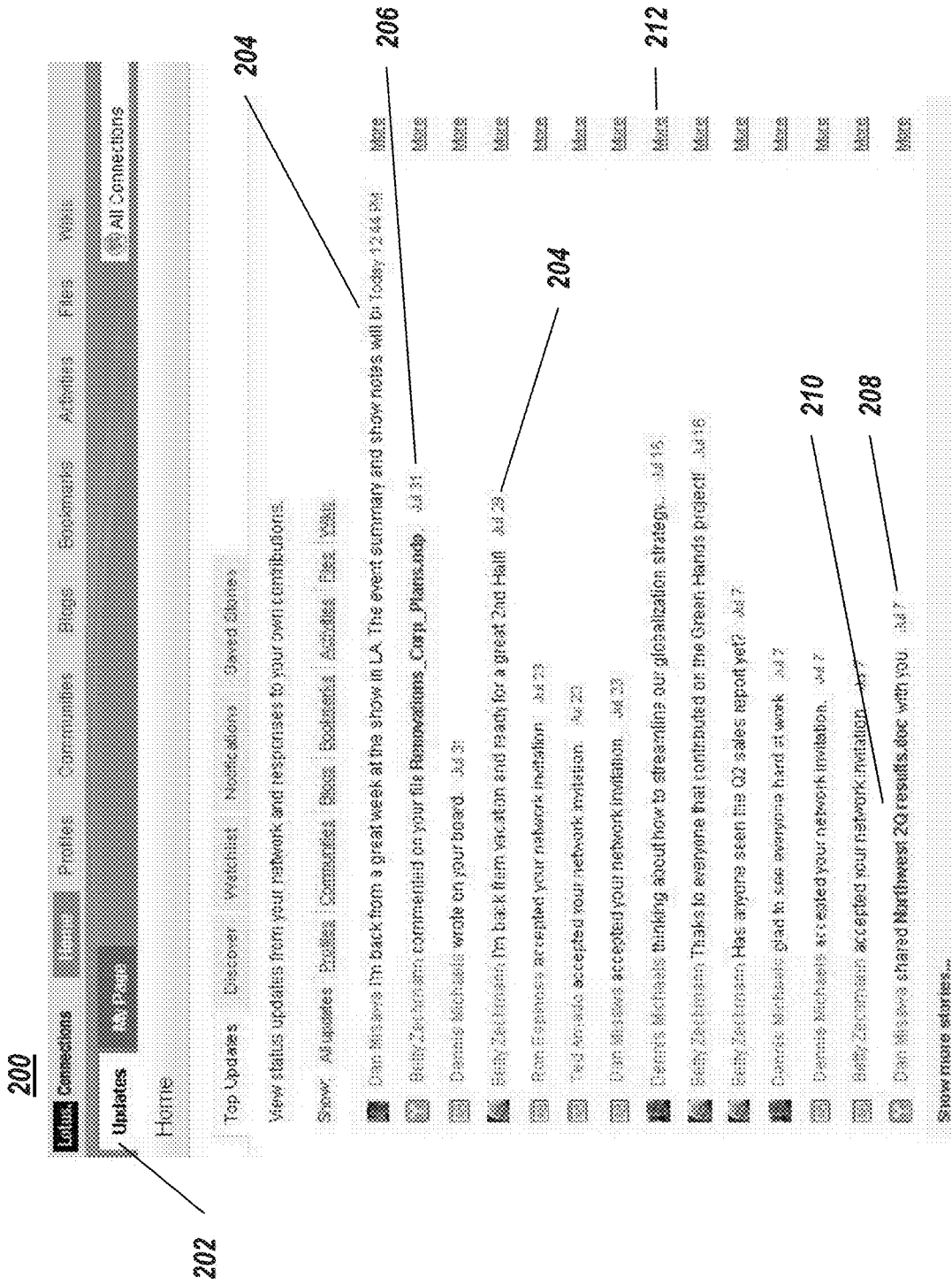
FIG. 2 illustrates an Updates tab of a Home part of a social software application.

The application can display a new content listing. Referring to FIG. 2, an Updates tab 202 of a Lotus Connections Homepage 200 is shown. The illustrated listing identifies new content to various Lotus Connections parts, e.g., a status update to a Profile 204, a comment on a File 206. Where the new content itself is susceptible to being displayed, e.g., the status update 204, such new content can be displayed directly, or by use of a scrolling marquee. Where the new content is less susceptible to being displayed directly, e.g., a newly shared document 208, a link 210 to the new content can be displayed. In each case, a link to more information, e.g., 212 can be presented by the device.

In some mobile communication device software architectures, a user may have to navigate to an application (e.g., via icon 530), and within an application further navigate (e.g., via icon 602, to page 200 or similar, and via link 212) to retrieve new content for which the user has received a notification. An application may have additional content to download once the user chooses to access the content related to the notification, e.g., via link 212. Particularly when a mobile device is out of coverage, this action may be impossible. In some cases when the device is out of coverage, the user may be required to navigate through several pages of unusable/incomplete information to reach the notifications and new content that has been pushed to the device. Some solutions may utilize the main phone screen to display pushed content as it arrives. This approach can get cluttered when multiple applications or feeds are subscribed to.

In some implementations, the technology receives new content and presents a notification of received new content via the device. The notification can be in the form of one or more of text, graphics, audio, haptics, transmission of a message, etc. In particular implementations, the notification is an asterisk on a solid color circular background displayed in superscript over at least one of an application icon, a mini icon, an application part/module icon. Upon receiving selection of the notification, the technology can directly display a listing of new notifications. When the device is out of coverage, the technology can offer navigation paths that relate only to content available on the device.

The technology can improve the reachability of pushed content by controlling which screen the technology displays when a notification of pushed content has been selected. In some implementations, the technology directly displays a list of new content, which list would otherwise be several page navigation steps away from other landing screens of the application. Navigation is further improved by the technology in the situation when the device is out of coverage by taking the user directly to the page(s) that contain the locally stored pushed content, bypassing screens that rely on over-the-air data retrieval.

Referring to FIG. 6, FIG. 7, and TABLE 1, the performance of some implementation of the technology is described. In these implementations, audio alert for new content notifications has been enabled on the mobile device.

In the situation of TABLE 1 Ref. 1-4 with the device in coverage, an audio alert sounds upon receiving notification of new content. Where the application i.e., Lotus Connections, is open and the listing of new content, i.e., "New Top Updates" (NTU) 704 is the current displayed screen, no notification is added to the Homepage icon 602 and the new content listing is added to NTU screen 704. If the NTU page 704 is the current landing page of the application, but the application is the background, then the screen is not refreshed and the notification is added to the Homepage icon 602. Where the application is open and any screen other than the NTU screen 704, e.g., the Top Updates (TU) screen 706, is displayed, a notification is added to the Homepage icon 602 and the Top Updates screen 706 remains the displayed screen. Upon receiving selection of the Homepage icon 602, the NTU screen 704 is displayed by the technology. When the device is in coverage and the application is not open, upon receiving a notification of new content, the technology can display a new content notification on at least one of the application mini icon 540 and the application main icon 530. Upon receiving selection of either icon 540, 530, or selection of any other form of actionable notification such as a link, an icon embedded in an email, or a message in some other social software the technology can display the NTU screen 704.

In the situations of TABLE 1 Ref. 5-8 with the device out of coverage, no additional notifications can be received. However, notifications previously received, and any pushed content associated therewith, can be presented by the technology. For example, when the application is not open, yet content had been pushed to the device while the device was in coverage, but the content list has not been displayed, both the application mini icon 512 and the application main icon 530 will display with a notification of new pushed content. Selection of either icon 530, 512 will cause the technology to display the NTU screen 704 in response. If the application is open and the NTU screen 704 is displayed while the device is out of coverage, then no indication of new content will be present at the application icon 530 or the application mini icon 512. If the TU screen 706 (or any screen other than the NTU screen 704) is displayed under those circumstances, then the application icon 530, the application mini icon 512, and the Homepage icon 602 will indicate new content, and selection of each icon will prompt the technology to display the NTU screen 704.

TABLE 1

| Ref. | In Coverage? | App. Open? | Current Screen | Behavior |
|---|---|---|---|---|
| 1 | Y | Y | NTU | Alert sounds. No star added to Homepage icon. New items added to current (NTU) screen. |
| 2 | Y | Y | TU | Alert sounds, Homepage icon gets star, Stay in current screen (TU), Click Homepage icon to see content in NTU |
| 3 | Y | Y | Other | Alert sounds, Homepage icon gets star, |

TABLE 1-continued

| Ref. | In Coverage? | App. Open? | Current Screen | Behavior |
|---|---|---|---|---|
| 4 | Y | N | N/A | Stay in current screen (Other), Click Homepage icon to see content in NTU Alert sounds, Connections mini-icon with splat on top of screen, Connections main icon with splat, Open app: no star added to Homepage icon, Go directly to NTU screen, New items added to NTU screen |
| 5 | N | N | N/A | Connections mini-icon with splat on top of screen, Connections main icon with splat, Open app: Homepage icon has star, Top Update list items unchanged, Go directly to NTU screen, New items added to NTU screen |
| 6 | N | Y | NTU | No star on Homepage icon Stay in NTU screen while in "Homepage" Homepage icon goes to NTU Other icons try to retrieve the usual content |
| 7 | N | Y | TU | Homepage icon has star unless visited since last update Homepage icon goes to NTU Stay in NTU screen while in "Homepage" Other icons try to retrieve the usual content |
| 8 | N | Y | Other | Homepage icon has star unless visited since last update Homepage icon goes to NTU Stay in NTU screen while in "Homepage" Other icons try to retrieve the usual content |

Figure 8:
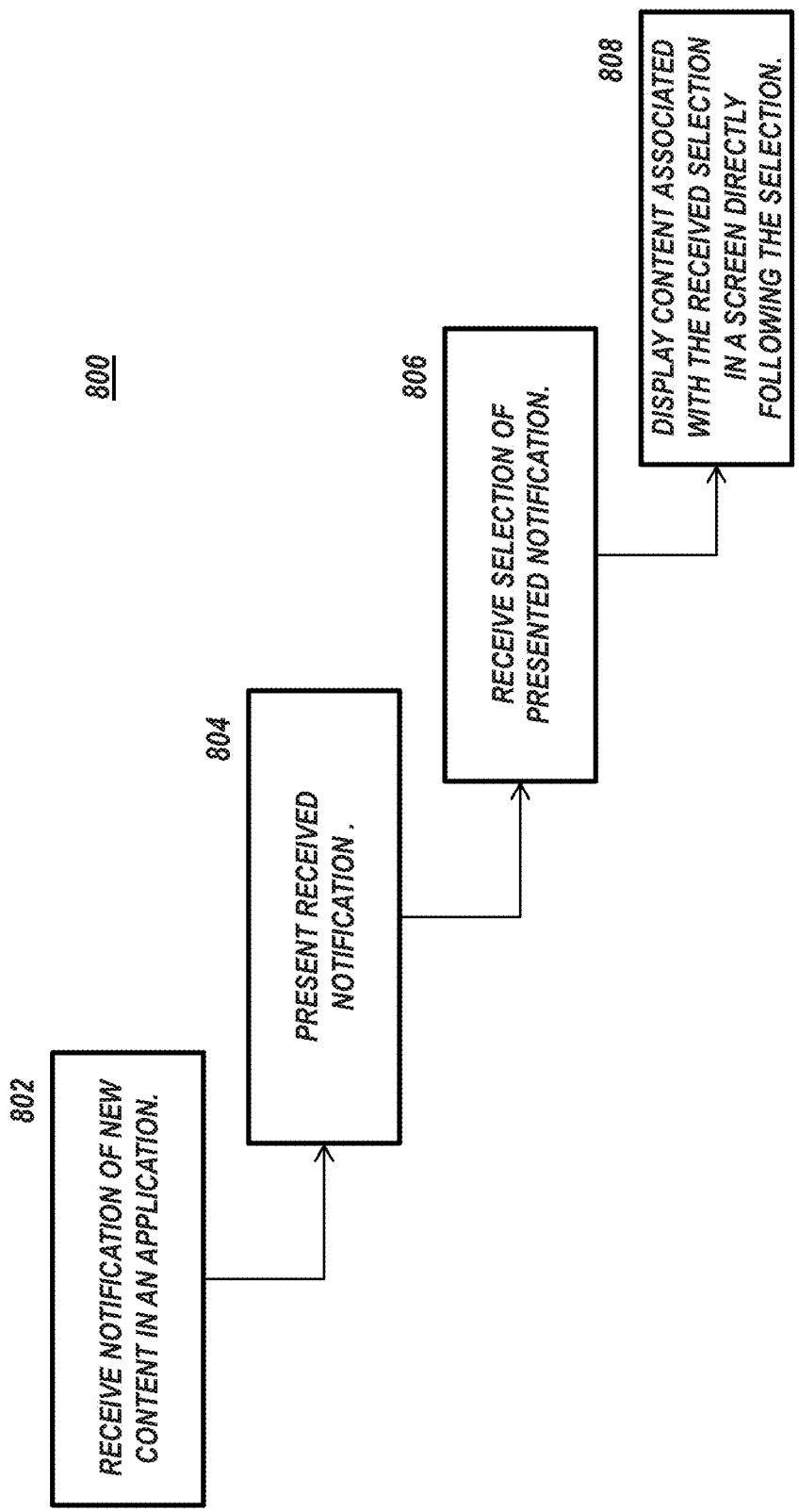
FIG. 8 illustrates methods of the technology.

Referring to FIG. 8, methods 800 of the technology are illustrated. The methods can be embodied as computer implemented methods, can be embodied in a communication device, and can be embodied in a computer program product. Methods 800 begin with receiving notification of new content within an application at a device 802. The received notification is presented at the device 804. Presenting the notification can be done within the application, outside the application, or both within and outside the application. Examples of notification presented outside the application include posting notification on a social network, posting notification to a web site, posting a message to a user's avatar in a virtual world, posting notification in a video conferencing session, posting notification in a web conference session, posting notification in an instant messaging session, posting notification in an email, and posting notification in a video game that the user is playing. Presentation can be by various means disclosed herein, including audio, visual, and haptic. Upon receiving selection of a presented notification 806, the new content can be displayed in the screen directly following such selection 808. In some implementations, displaying the new content in the screen directly following receiving the selection of the notification comprises displaying only the new content stored on the device. Displaying only the new pushed content stored on the device can reduce the number of screens, including non-applicable screens, that a user must navigate to access the content that is available.

The technology can take the forms of hardware, software or both hardware and software elements. In some implementations, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, removable memory connected via USB, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD, and Blu Ray™. Both processors and program code for implementing each as aspect of the technology can be centralized or distributed (or a combination thereof) as known to those skilled in the art.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem, WiFi, and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

What is claimed is:

1. A computer-implemented method of presenting a notification of received pushed content on a communications device having a display and a plurality of applications, the method comprising:
    obtaining, via a processor, the received pushed content at the communications device;
    determining an application associated with the received pushed content;
    displaying a mini-icon associated with the application in a home screen header;
    presenting an indicator at the mini-icon when the pushed content is received;
    delivering a notification of the received pushed content to the application associated with received pushed content; and
    bypassing a landing screen selected for the application, wherein the landing screen is selected based on the received pushed content and presented on the display in response to a selection of an icon on the display that corresponds to the application, and wherein the landing screen is bypassed when, while the device is operating offline, the landing screen requests an over-the-air data retrieval when displaying the received pushed content on the landing screen.

2. The computer-implemented method of claim 1, further comprising:
    displaying the icon on the display that corresponds to the application;
    presenting a second indicator on the icon corresponding to the application associated with the received pushed content; and
    receiving a selection of the icon.

3. The computer-implemented method of claim 2, wherein receiving the selection of the icon further comprises:
    receiving the selection while the device is operating offline;
    obtaining the received pushed content from a device memory; and
    displaying the received pushed content on the landing screen while the device is operating offline.

4. The computer-implemented method of claim 2, further comprising:
    selecting the landing screen for the application based on the received pushed content, the landing screen being selected among a plurality of landing screens associated with the application, the landing screen being different than a home screen of the application.

5. The computer-implemented method of claim 4, wherein the received pushed content is presented in both the landing screen and the application.

6. The computer-implemented method of claim 1, wherein the application includes at least one of a social network application, a web application, and a gaming application.

7. A non-transitory computer-readable medium having stored therein instructions which, when executed by a processor, cause the processor to perform a method comprising:
    obtaining a received pushed content at the communications device having a display and a plurality of applications;
    determining an application associated with the received pushed content;
    displaying a mini-icon associated with the application in a home screen header;
    presenting an indicator at the mini-icon when the pushed content is received;
    delivering a notification of the received pushed content to the application associated with the pushed content; and
    bypassing a landing screen selected for the application, wherein the landing screen is selected based on the received pushed content and presented on the display in response to a selection of an icon on the display that corresponds to the application, and wherein the landing screen is bypassed when, while the device is operating offline, the landing screen requests an over-the-air data retrieval when displaying the received pushed content on the landing screen.

8. The non-transitory computer-readable medium of claim 7 having stored therein instructions which, when executed by the processor, cause the processor to further perform the method comprising:
    displaying the icon on the display that corresponds to the application;
    presenting a second indicator on the icon corresponding to the application associated with the received pushed content; and
    receiving a selection of the icon.

9. The non-transitory computer-readable medium of claim 8 having stored therein instructions which, when executed by the processor, cause the processor to further perform the method comprising:
    receiving the selection while the device is operating offline;
    obtaining the received pushed content from a device memory; and
    displaying the received pushed content on the landing screen while the device is operating offline.

10. The non-transitory computer-readable medium of claim 8 having stored therein instructions which, when executed by the processor, cause the processor to further perform the method comprising:
    selecting the landing screen for the application based on the received pushed content, the landing screen being selected among a plurality of landing screens associated with the application, the landing screen being different than a home screen of the application.

11. The non-transitory computer-readable medium of claim 10 having stored therein instructions which, when executed by the processor, cause the processor to present the received pushed content in both the landing screen and the application.

12. The non-transitory computer-readable medium of claim 7 having stored therein instructions which, when executed by the processor, cause the processor to access the application including at least one of a social network application, a web application, and a gaming application.

13. A communications device having a display and a plurality of applications, the mobile communication device comprising:
    at least one processor;
    a non-transitory computer-readable storage medium having stored therein instructions which, when executed by the processor, cause the processor to:
        obtain a received pushed content at the communications device having a display and a plurality of applications;
        determine an application associated with the received pushed content;

display a mini-icon associated with the application in a home screen header;

present an indicator at the mini-icon when the pushed content is received;

deliver a notification of the received pushed content to the application associated with the received pushed content; and bypass a landing screen selected for the application, wherein the landing screen is selected based on the received pushed content and presented on the display in response to a selection of an icon on the display that corresponds to the application, and wherein the landing screen is bypassed when, while the device is operating offline, the landing screen requests an over-the-air data retrieval when displaying the received pushed content on the landing screen.

14. The communications device of claim 13, wherein the processor is further configured to:

display the icon on the display that corresponds to the application;

present a second indicator on the icon corresponding to the application associated with the received pushed content; and receive a selection of the icon.

15. The communications device of claim 14, wherein the processor is further configured to:

receive the selection while the device is operating offline;

obtain the received pushed content from a device memory; and display the received pushed content on the landing screen while the device is operating offline.

16. The communications device of claim 14, wherein the processor is further configured to:

select the landing screen for the application based on the received pushed content, the landing screen being selected among a plurality of landing screens associated with the application, the landing screen being different than a home screen of the application.

17. The communications device of claim 16, wherein the processor is further configured to present the received pushed content in both the landing screen and the application.

18. The communications device of claim 13, wherein the processor is further configured to access the application including at least one of a social network application, a web application, and a gaming application.

* * * * *